United States Patent [19]
Boundy et al.

[11] Patent Number: 5,480,308
[45] Date of Patent: Jan. 2, 1996

[54] WOODEN IDENTIFICATION BLOCKS

[76] Inventors: Henriette E. Boundy; Bruce K. Boundy, both of 6543 Thornapple River Dr., Alto, Mich. 49302

[21] Appl. No.: 427,690

[22] Filed: Apr. 24, 1995

Related U.S. Application Data

[63] Continuation of Ser. No. 126,059, Sep. 23, 1993, abandoned.

[51] Int. Cl.[6] .................................................. G09B 23/38
[52] U.S. Cl. ........................... 434/296; 434/367; 434/403
[58] Field of Search ....................................... 434/172, 208, 434/296, 367, 403, 406, 295; 446/117

[56] References Cited

U.S. PATENT DOCUMENTS

| 2,645,038 | 7/1953 | Merrill | 434/208 X |
| 3,008,247 | 11/1961 | Gaumond | 434/367 |
| 4,846,687 | 7/1989 | White et al. | 434/403 X |
| 5,176,519 | 1/1993 | Matiaci et al. | 434/296 X |

OTHER PUBLICATIONS

Museum of Modern Art Catalog, p. 10, Fall 1993, New York.
*The Audobon Society Field Guide to North American Trees, Eastern Region*, one representative page, Alfred A. Knopf, New York, 1980, Elbert L. Little, Editor.
*The Audobon Society Field Guide to North American Trees, Western Region*, one representative page, Alfred A. Knopf, New York, 1980, Elbert L. Little, Editor.
*The Encyclopedia of Wood*, p. 68, Facts on File/Quarto Publishing, 1989, Aidan Walker, Editor.
*Hugh Johnson's Encyclopedia of Trees*, p. 228, Portland House Publishers, 1990, Hugh Johnson, Editor.
*The International Book of Wood*, p. 23, Simon & Schuster, 1979, Martyn Bramwell, Editor.
*Michigan Trees*, pp. 192–193, Barnes & Wagner, The University of Michigan Press, 1981.
*Trees*, pp. 100–101, Dorling Kindersley, Inc., 1992, Allen J. Coombes, Editor.
*Understanding Wood*, p. 58, The Taunton Press, 1980, R. Bruce Hoadley, Editor.
*Wood Handbook: Wood as an Engineering Material*, pp. 1.9–1.10, Agriculture Handbook 72, U.S. Dept. of Agriculture, ForestService, Rev. 6–87.
Reprint from *Wood & Wood Products* magazine, Nov. 1988, p. 36.

*Primary Examiner*—Robert P. Swiatek
*Attorney, Agent, or Firm*—David E. Boundy

[57] ABSTRACT

Each block of a set of wooden blocks bears indicia of the tree species of the wood from which the block is made. Preferred embodiments may include the following features. The blocks are configured as building blocks for children. The indicia on each block show the living tree from which the lumber for the block is derived. The indicia are laser etched upon the blocks. The indicia comprise a picture of a living tree, divided into two portions, one portion showing the tree foliated and one portion showing the tree defoliated. The indicia comprise a picture of a leaf of the living tree, the common name of the tree species and the taxonomic name. The blocks are accompanied by a data sheet further describing the woods and trees of the blocks of the set.

22 Claims, 6 Drawing Sheets

WOODEN IDENTIFICATION BLOCKS

This is a continuation of application Ser. No. 08/126,059, filed Sep. 23, 1993, now abandoned.

BACKGROUND OF THE INVENTION

The invention relates to wooden blocks.

Tree field guides typically show several tree species with their usual structural shapes, leaf forms, fruit forms, bark appearance, and size. Other books, typically directed to the furniture industry or other wood products industries, typically describe the lumber from many tree species, showing the grain pattern, wood color, and economic uses of the wood.

SUMMARY OF THE INVENTION

In the invention, each block of a set of wooden blocks bears indicia of the tree species of the wood from which the block is made.

In preferred embodiments, the blocks are configured as building blocks for children. The indicia on each block show the shape or includes living tree from which the lumber for the block is derived. The indicia are laser etched upon the blocks. The indicia comprise a picture of a living tree, divided into two portions, one portion showing the tree foliated and one portion showing the tree defoliated. The indicia also includes a picture of a leaf of the living tree, the common name of the tree species and the taxonomic name. The blocks are accompanied by a data sheet further describing the woods and trees of the blocks of the set.

Among the advantages of the invention are the following. The blocks teach the connection between the living tree and the lumber derived from the tree. The three-dimensional block is a distinct improvement over the pictorial representation of the wood presented in a book, as one can observe the subtle effects as light is diffracted and reflected from the grain at varying angles. The blocks are helpful to the craftsman who wishes to identify lumber whose identification is either lost or doubtful or who wishes to make an appropriate selection of species for an intended use.

Further advantages and features of the invention will become apparent from the figures, description, and claims.

DESCRIPTION OF THE PREFERRED EMBODIMENTS

Figure 1:
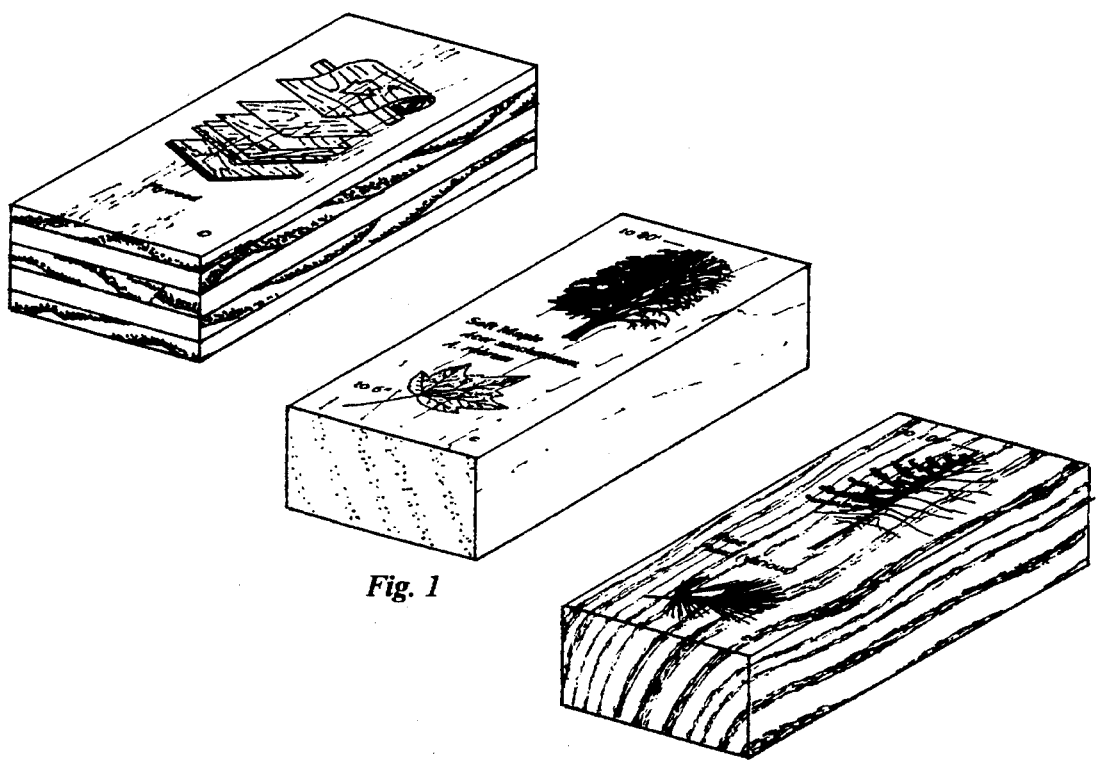
FIG. 1 is an isometric view of a set of three blocks of the invention.
Figure 2:
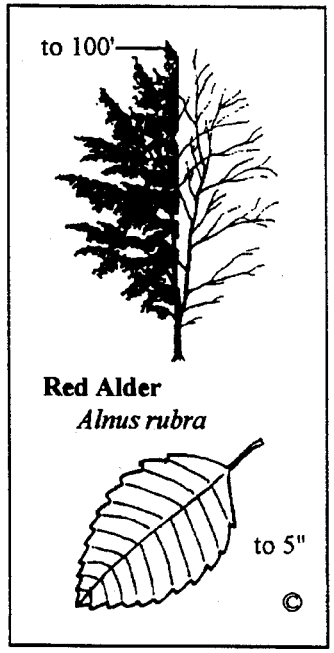
FIGS. 2–31 are plan views of thirty blocks for thirty tree species.
Figure 3:
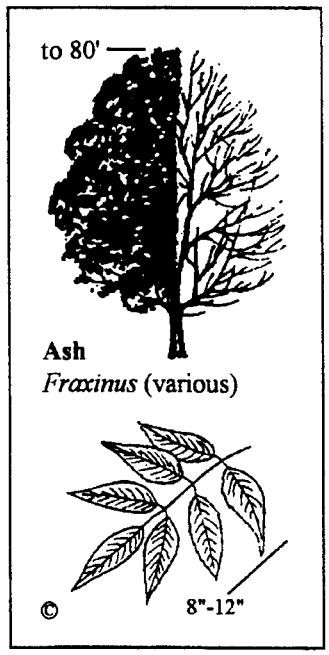
Figure 4:
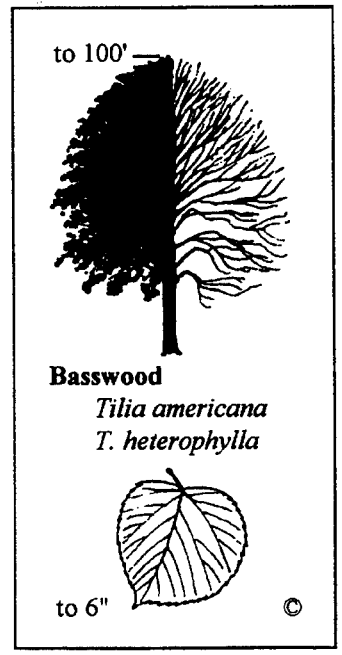
Figure 5:
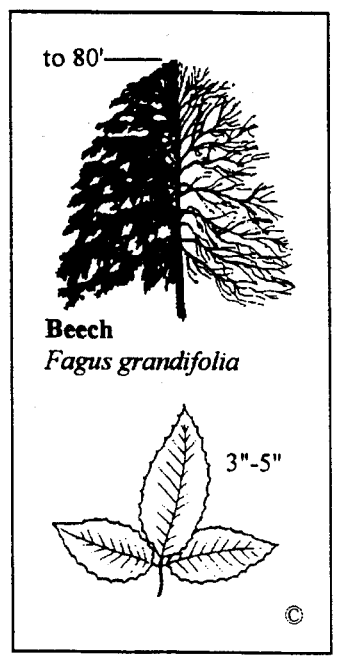
Figure 6:
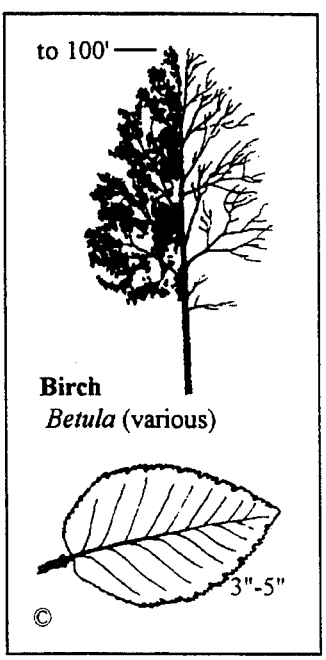
Figure 7:
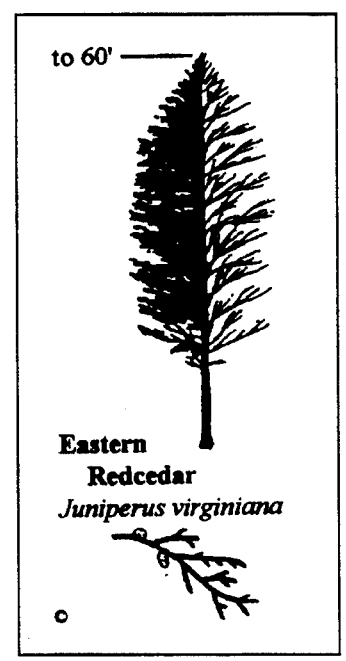
Figure 8:
Figure 9:
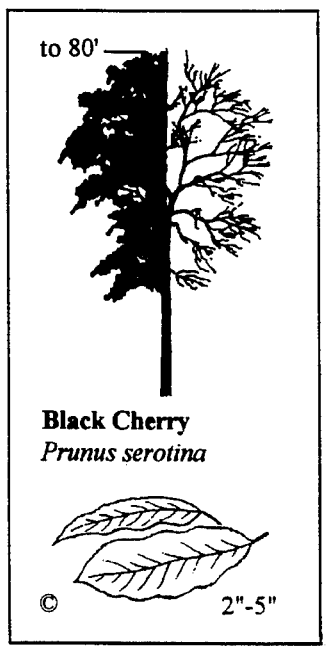
Figure 10:
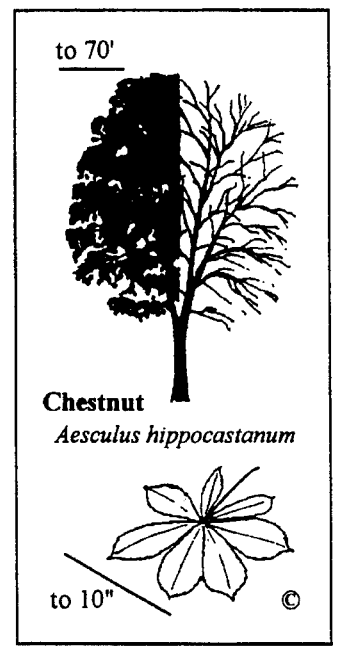
Figure 11:
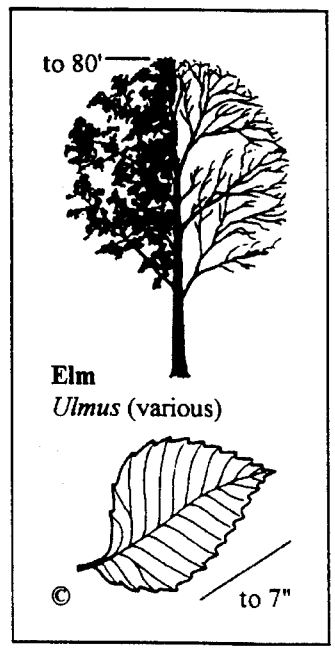
Figure 12:
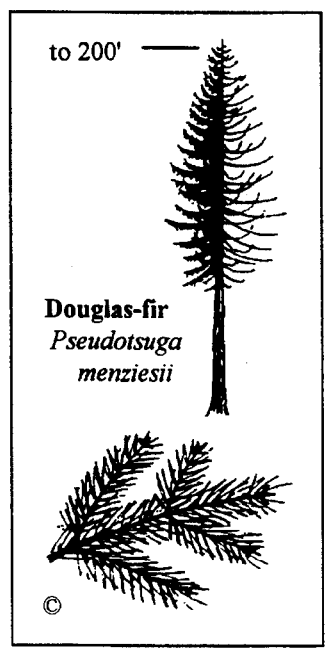
Figure 13:
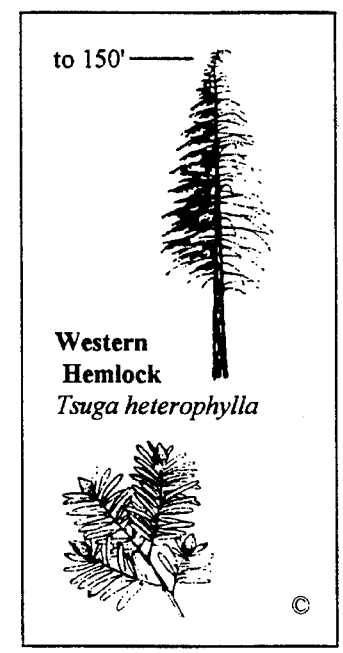
Figure 14:
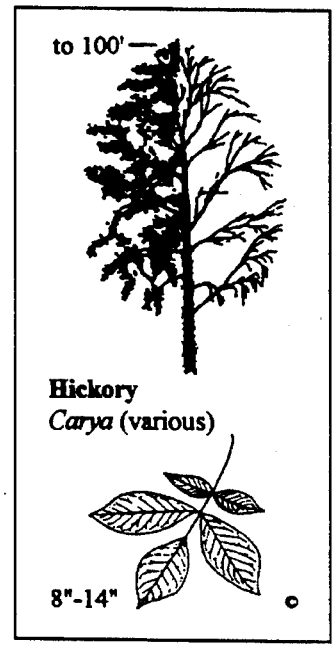
Figure 15:
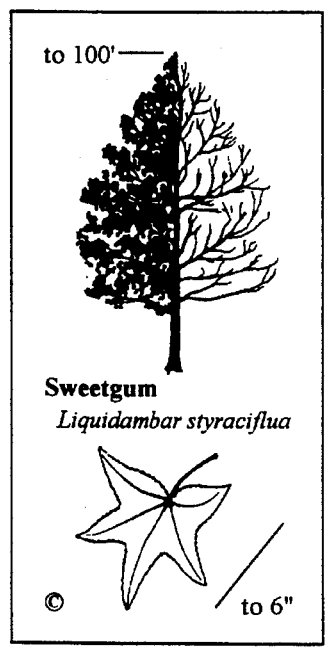
Figure 16:
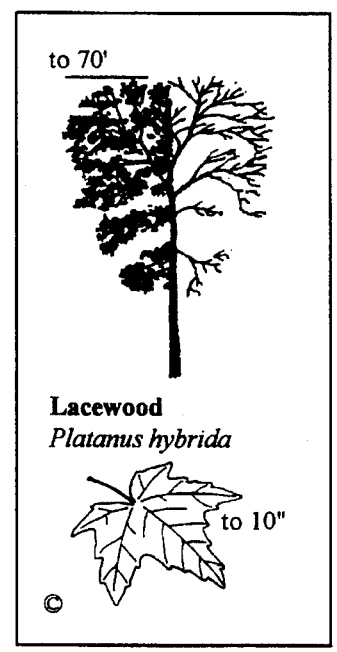
Figure 17:
Figure 18:
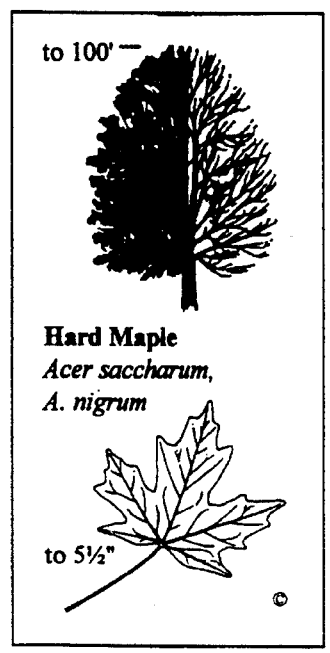
Figure 19:
Figure 20:
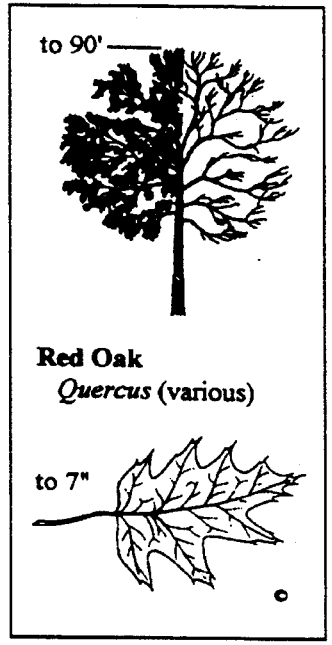
Figure 21:
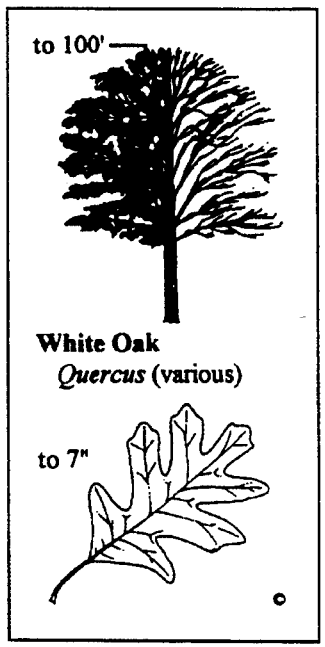
Figure 22:
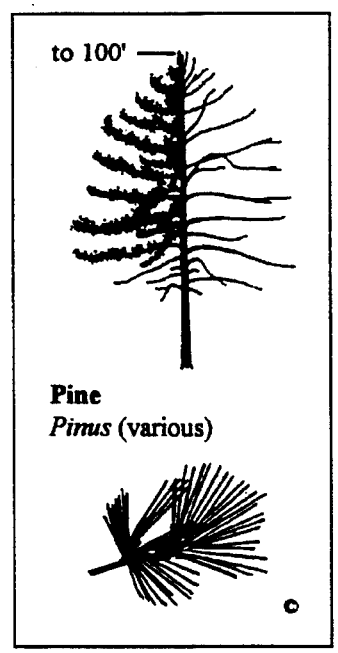
Figure 23:
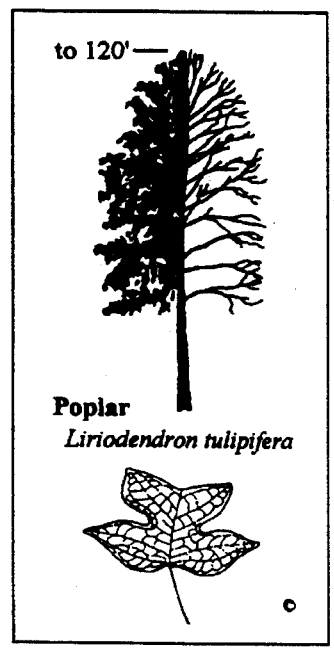
Figure 24:
Figure 25:
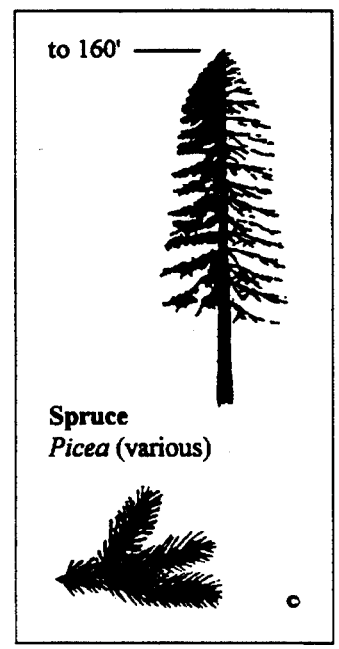
Figure 26:
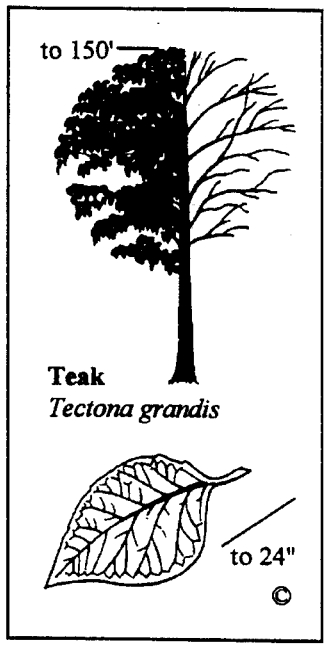
Figure 27:
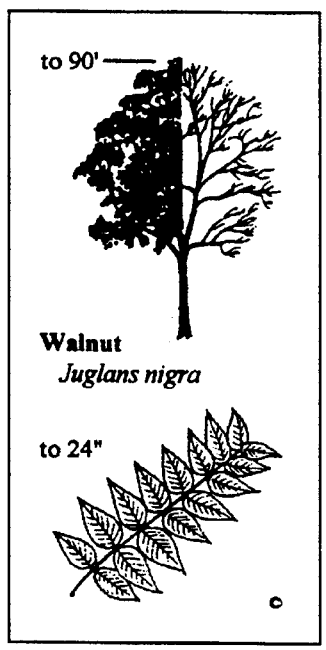
Figure 28:
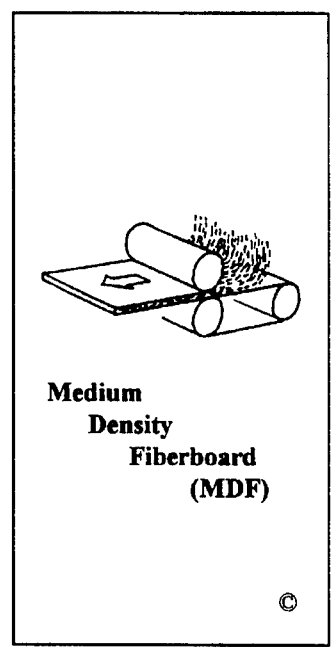
Figure 29:
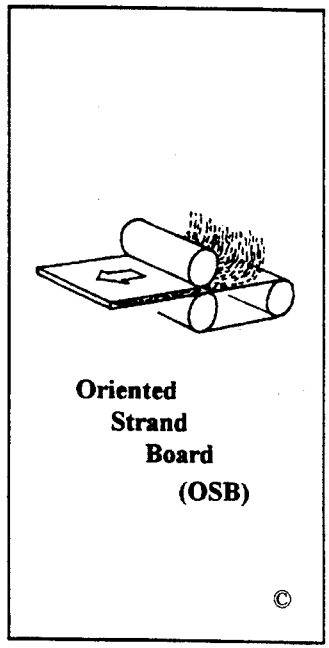
Figure 30:
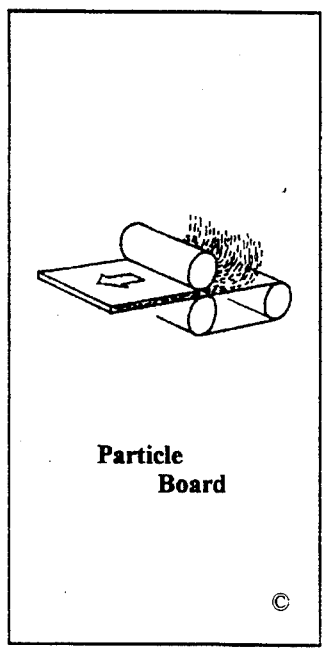
Figure 31:
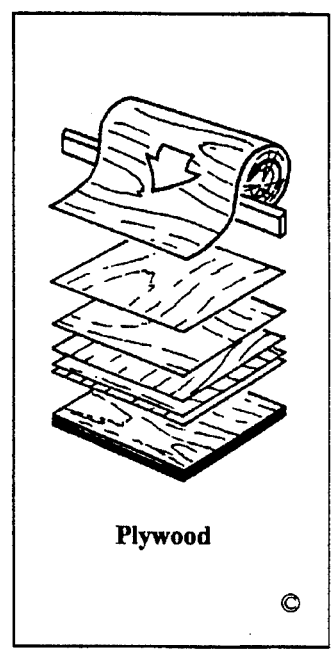

Referring to FIG. 1, the blocks of a set of three blocks are derived from different tree species: pine (with vary bold grain), soft maple (with very subtle grain), and plywood. Each of the three blocks has imprinted thereon indicia of the species from which its wood is derived, including a picture of the living tree, a picture of a leaf, and the common and taxonomic names of the tree.

The blocks are rectangular, with all three dimensions large enough to provide a usable view of the various grain exposures, i.e., face grain (flat sawn), side grain (quarter sawn), and end grain. All blocks of all species may be the same size, for instance dimensioned in proportions 1 by 2 by 4, thus providing the added function of toy blocks for children.

The indicia on each block may show a property of the living tree from which the block is made. For instance, each block may show the structure of the tree: a picture of the tree may be split to show the tree in its foliated and defoliated conditions. The block may also show a typical leaf of the tree, the height of the mature tree, and the size of the mature leaf. It is also desirable that the block indicate the name of the tree species, for instance showing the common and taxonomic name of the tree species, or the trade name for the lumber from the tree.

The information may be imprinted by any of several means, depending on cost constraints and the degree of detail or permanence desired. Preferred methods include laser engraving, pressure embossing with a die, burning with a heated iron, or printing with pigmented liquid or powder. After laser engraving or die burning, it may be desireable to apply another sanding step to remove overburn marks.

As shown in FIGS. 2–31, a full set of the blocks may include many tree species, for instance forming a cross section of the world's trees, and, as shown in FIGS. 28–31, blocks made from processed wood products such as particle board, fiberboard, oriented strand board (chip board), or plywood. Alternately, the blocks may be packaged in smaller sets according to a number of criteria. One set could reflect the trees native to a certain region, for instance trees from the Great Lakes region. Another set could be selected according to a common economic use, for instance, woods used for furniture. Complementary sets could be assembled, for instance consisting of hardwoods, softwoods, or tropical woods.

Each set of blocks may include data sheets that more fully describe the trees and the lumber therefrom for the tree species of the blocks in the set. These data sheets describe the related species of the tree's genus, the range of the species, identifying characteristics of the tree, workability of the wood, and the commercial uses to which the wood is put. The data sheet can also describe how the tree is related to its wood, for instance how different parts of the tree's wood are useful for different purposes, or how the tree is related to its environment, for instance the ecological niches it fills and provides.

The different faces of the blocks may be finished differently. For instance, one face may be sanded but unfinished, and other faces finished with different finishes to show the different appearances the wood takes on with those different finishes.

The blocks may be useful to those in wood products industries, for instance as salesman's samples to show how various woods take various finishes, or to show different woods from which a final manufactured product could be made.

Other embodiments are within the following claims.

What is claimed is:

1. A set of instructional materials, comprising:
   two or more loose wooden blocks, each block of the set being formed of the wood of a different tree species, and each block having thereon at least two indicia indicating the species from which the block is derived, each block being a rectangular prism, with dimensions in small integer ratios to each other, the indicia lying flush with the block surface or relieved into the block surface, and at least one of said indicia comprising a picture selected from a group consisting of a picture of a full tree of the species and a picture of a leaf of a living tree of the species.

2. The set of instructional materials of claim 1 wherein the indicia comprise a picture of a full tree, said picture being divided into two portions, one portion showing the tree foliated and one portion showing the tree defoliated.

3. The set of instructional materials of claim 1 wherein the indicia comprise both a picture of a full tree of the species and a picture of a leaf of the living tree.

4. The set of instructional materials of claim 3 wherein said indicia comprise a picture of a full tree, said picture being divided into two portions, one portion showing the tree foliated and one portion showing the tree defoliated.

5. The set of instructional materials of claim 1 further comprising a data sheet further describing the woods and trees of the blocks of the set.

6. A set of two or more wooden blocks, each block being made of the wood of a different tree species, and having thereon indicia indicating a property of a living tree of the species from which the block is derived, said indicia comprising a picture selected from a group consisting of a picture of a full tree of the species and a picture of a leaf of a living tree of the species.

7. The set of wooden blocks of claim 6 wherein the indicia are formed by laser etching of the blocks.

8. The set of wooden blocks of claim 8 wherein the indicia comprise a picture of a full tree, the picture being divided into two portions, one portion showing the tree foliated and one portion showing the tree defoliated.

9. The set of wooden blocks of claims 6, wherein the indicia comprise both a picture of a full tree of the species and a picture of a leaf of the living tree.

10. The set of wooden blocks of claim 9 wherein the indicia further comprise the common name of the tree species and the taxonomic name.

11. The set of wooden blocks of claim 6 wherein the indicia further comprise the common name of the tree species and the taxonomic name.

12. The set of wooden blocks of claim 6 further comprising a data sheet further describing the woods and trees of the blocks of the set.

13. A set of two or more loose wooden blocks, each block of the set being formed of the wood of a different tree species, and each block having thereon indicia of the tree species from which the block is derived, each block being a rectangular prism, with dimensions in small integer ratios to each other, the indicia lying flush with the block surface or relieved into the block surface.

14. The set of wooden blocks of claim 13 wherein the indicia are formed by laser etching of the blocks.

15. The set of wooden blocks of claim 13 wherein the indicia comprise a picture of a living tree.

16. The set of wooden blocks of claim 13 wherein the indicia comprise a picture of a full tree, the picture being divided into two portions, one portion showing the tree foliated and one portion showing the tree defoliated.

17. The set of wooden blocks of claim 13 wherein the indicia comprise a picture of a leaf of the living tree.

18. The set of wooden blocks of claim 17 wherein the indicia further comprise the common name of the tree species and the taxonomic name.

19. The set of wooden blocks of claim 13 wherein the indicia further comprise the common name of the tree species and the taxonomic name.

20. The set of wooden blocks of claim 13 further comprising a data sheet further describing the woods and trees of the blocks of the set.

21. The set of wooden blocks of claim 13 wherein the indicia are formed by burning with a heated iron or die.

22. The set of wooden blocks of claim 13 wherein the indicia are formed by printing with pigmented liquid or powder.

* * * * *